July 15, 1924.
DE WITT NELSON ET AL
1,501,176
RESILIENT WHEEL AND TIRE STRUCTURE
Filed Aug. 17, 1922     2 Sheets-Sheet 1
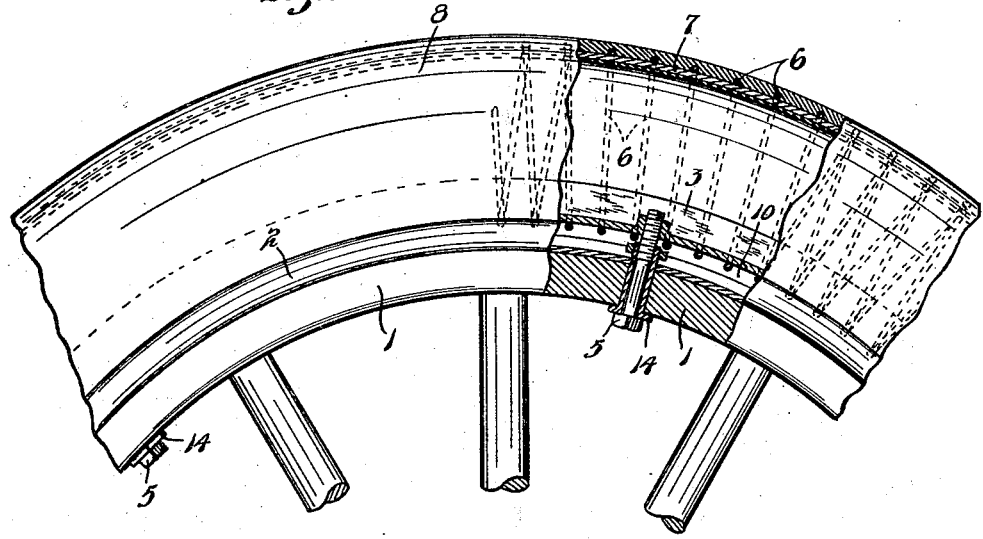
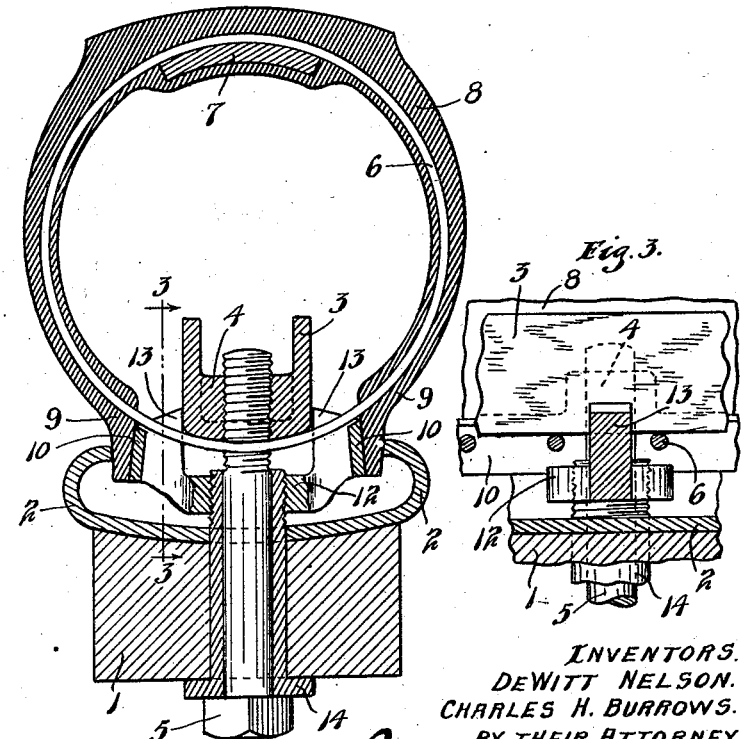
INVENTORS.
DEWITT NELSON.
CHARLES H. BURROWS.
BY THEIR ATTORNEY.
James F. Williamson

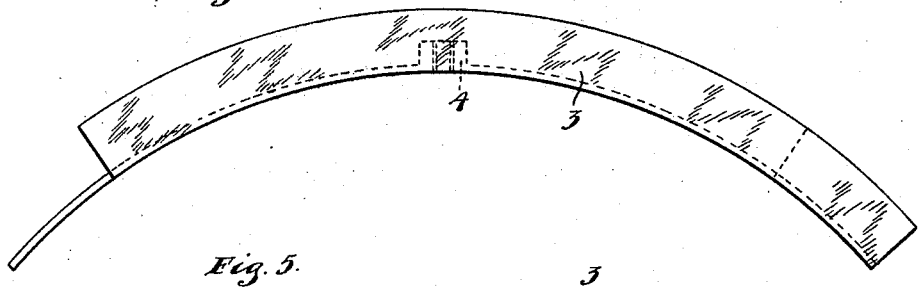
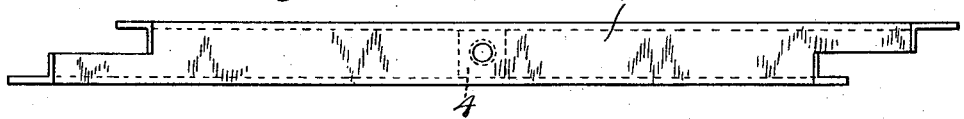
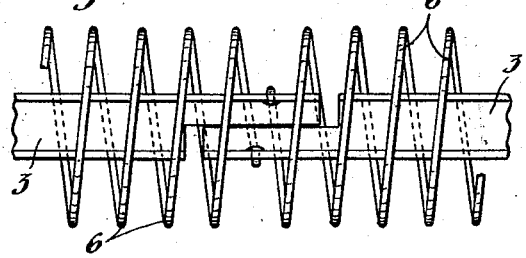
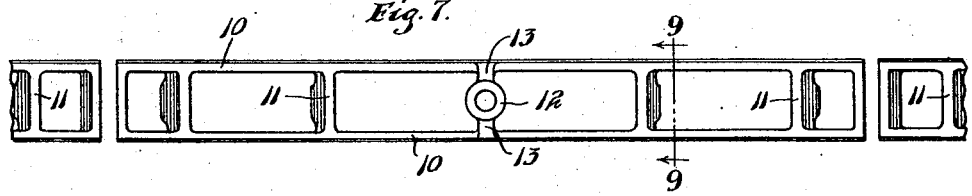
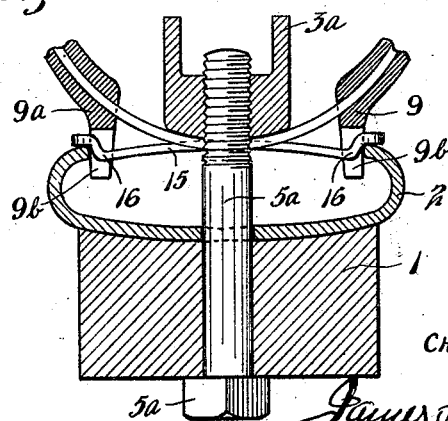

Patented July 15, 1924.

1,501,176

UNITED STATES PATENT OFFICE.

DE WITT NELSON AND CHARLES H. BURROWS, OF MINNEAPOLIS, MINNESOTA.

RESILIENT WHEEL AND TIRE STRUCTURE.

Application filed August 17, 1922. Serial No. 582,409.

*To all whom it may concern:*

Be it known that we, DE WITT NELSON and CHARLES H. BURROWS, citizens of the United States, residing at Minneapolis, in the county of Hennepin and State of Minnesota, have invented certain new and useful Improvements in Resilient Wheel and Tire Structures; and we do hereby declare the following to be a full, clear, and exact description of the invention, such as will enable others skilled in the art to which it appertains to make and use the same.

This invention relates to a resilient wheel and tire structure for a vehicle such as an automobile. As is well known to all users of such machines, the pneumatic tire is a great item of expense and trouble and much effort has been made to produce a wheel and tire structure not dependent upon the pneumatic feature for resiliency. While it has heretofore been proposed to use a helical spring on the wheel for supporting the load, such springs have been so constructed that there is too much distortion at one point thereof and such springs have commonly been in contact with the wheel at their inner radial side.

It is an object of the present invention therefore to provide a wheel and tire structure comprising a helix of wire extending about the rim of the wheel, which helix is spaced from the rim and provided with means for distributing the weight of the load circumferentially about said spring.

It is another object of the invention to provide a wheel having such a spring embedded in a tire casing and having means for distributing the load strain circumferentially about the spring as well as means for varying the tension of the spring.

It is more specifically an object of the invention to construct a wheel comprising such a helical spring as above set forth, in combination with a resilient hoop enclosed by the same at the outer side thereof and alined segmental members enclosed by the spring at its inner side together with means for securing said segmental members in radially spaced relation to the rim of the wheel.

It is still another object to provide such a wheel having separate means for holding the inner edges of the tire which enclose the helical spring against the edges of the rim.

These and other objects and advantages of the invention will be fully set forth in the following description made in connection with the accompanying drawings in which, like reference characters refer to the same parts through the different views, and in which, Fig. 1 is a view in side elevation of the wheel of the present invention, a portion thereof being shown in section;

Fig. 2 is substantially a radial section of the wheel shown in Fig. 1 shown on an enlarged scale;

Fig. 3 is a vertical section taken on the line 3—3 of Fig. 2, as indicated by the arrows;

Fig. 4 is a view in side elevation of one of the spring and tire holding segments used;

Fig. 5 is a bottom plan view of said part;

Fig. 6 is a plan view of a portion of the helical spring and segmental members used;

Fig. 7 is a plan view of one of the spring and tire clamping segments of the wheel with similar segments shown in alined relation thereto;

Fig. 8 is a partial radial section of a modified structure; and

Fig. 9 is a vertical section taken on the line 9—9 of Fig. 7.

Referring to the drawings, a wheel of the automobile type is shown, comprising, the usual spokes secured to a rigid peripheral member illustrated as a felloe 1 to which felloe is bolted or secured, in the usual manner, a rim 2 having its sides bent or curved inwardly. A plurality of segmental members 3 are used, which members are of U-shape in cross section with their arms projecting outwardly radially of the wheel. The members 3 have their ends cut away or rabbeted so as to overlap, as shown in Fig. 6, and a nut member 4 is provided which, in practice, is spot welded between the sides of the members 3 and is threaded to receive the threaded end of a bolt 5, which bolts are disposed in circumferentially spaced relation about the wheel and pass through the rim and felloe thereof. Surrounding each segmental member 3 is a section of helical spring 6 formed of strong resilient steel wire, which spring encloses the members 3 and contacts with the inner side thereof, as shown in Fig. 2. It should be noted that the section in Fig. 2 shows one of the helices of the spring passing in front of the bolt 5, said bolt, as shown in Fig. 1, passing between the helices or convolutions of the spring. The ends of the spring 6 pass under the ends of the members 3 adjacent the member about which they extend and have their ends extending through and riveted to the inside of the arms of the members 3, as shown in Fig. 6. The sections of spring 6 thus form a connecting means for the members 3 tending to hold the same in proper position. A continuous resilient hoop member 7 is provided which extends circumferentially about the wheel and in contact with the spring 6 at its outer side, said hoop being enclosed by the spring. The hoop 7 and spring 6 are shown as embedded in and encased by a tire 8 which will be made of rubber or other suitable tire fabric, the inner portion of the spring 6 being free of the tire, the side edges 9 of which tire are disposed in contact with the inner sides of the rim member 2. It will be noted that the segmental members 3 are radially spaced from the member 2, and these members are drawn down against the spring 6 to give the desired tension thereon and the spring 6 is thus supported outwardly from the member 2 by the bolts 5 in much the same manner as the rim on a bicycle wheel is drawn inwardly and supported by the spokes. The tension of the spring can, of course, be varied by adjustment of the bolts 5.

In order to hold the edges 9 of the tire against the sides of the member 2 and provide a tight joint to exclude dirt and moisture, segmental members 10 are provided which comprise spaced flat strips converging slightly toward the outer edges and connected at intervals by thin cross members 11. At the center of each of the segments 10 a lug 12 is provided having arms 13 extending from each side thereof to the sides of the member 10, which arms have projections extending radially outward and passing between the convolutions of the spring 6, as clearly shown in Fig. 3. The lug 12 is threaded and has screwed thereinto the inner end of a sleeve member 14 passing through the felloe 1 and rim 2 and surrounding and fitting the bolt 5, said sleeve being provided with a head or flange portion of polygonal shape at the inner side of the felloe disposed under the head of bolt 5.

In assembling the wheel, the bolts 5 and sleeves 14 will be placed through the holes made therefor in the felloe and the segmental members 10 placed in position and slightly engaged with the ends of sleeves 14. The segmental members 3 which are secured to the spring 6, together with the tire and the hoop 7, will then be placed on the rim and the bolts 5 engaged with the nuts 4. The bolts 5 will now be turned to bring the spring 6 to the desired tension to give a rigid and firm support. After the spring and tire have thus been properly positioned and tensioned, the sleeves 14 will be turned to move the segmental members 10 radially inward and, owing to the tapered shape of the same, the sides thereof will press against the side edges 9 of the tire and force the same against the sides of the rim. The wheel will then be properly assembled for use.

When the load stress is placed on the wheel, the tendency is to flatten out the coils of the spring 6 on the tread side of the wheel. However, the hoop 7 is distorted by the load and transmits the load stress to the coils of spring 6 at the top of the wheel on the side of said coils opposite the tread, and, in turn, by the distortion of the hoop 7, said stress is also transmitted proportionately to the coils of the spring 6 at the sides of the wheel. It is thus seen that the hoop 7 acts to substantially uniformly distribute the load stress circumferentially about the spring 6. Furthermore, any distortion or movement of the spring 6 is resisted by the segmental members 3 and the bolts 5 which support the spring 6. The stress is thus distributed about the spring 6 by the bolts 5, as above stated, in much the same manner as the stress on the well known bicycle rim is distributed by the tensioned spokes. The coaction of the annular member 6, hoop 7 and the annulus formed by the segmental members 3 thus uniformly distributes the load stress about the spring 6. The body of the tire 8 will, of course, yield to conform to any resilient movements of the parts 6 and 7. The members 10 also act to transmit lateral stress coming on the tire to the rim 2. It is obvious that in making turns and at other times, there is considerable lateral stress transmitted to the tire and this will be absorbed and resiliently transmitted to the rim 2 by the sides of the member 10 and the interposed edges of the tire.

In the modification shown in Fig. 8, the member 10 and sleeve 15 are not used, the bolts 5ª fitting directly in the felloe 1 and the rim 2. The edges of the tire 9ª are provided with circumferentially spaced notches 9ᵇ and flat narrow members 15 are provided extending transversely of the member 3ª at suitably spaced points. The member 15 is in contact with the inner side of the member 3ª and is welded thereto. The said member 15 is provided with offsets forming shoulders 16 adjacent the edges of the rim 2 and the ends of said member project outwardly on top of said edges. The member 15 is formed of resilient or spring material and will thus accommodate a slight inward movement of the member 3ª. The shoulder 16 will take care of many lateral stresses placed upon the tire 9ª and will contact with the edges of the member 2 and transmit such stress to said edges.

From the above description it is seen that applicant has provided a simple and efficient wheel and tire structure and one which will effectively and resiliently support the load. The load stress is distributed uniformly about the wheel and, as stated, the helical spring 6 can be adjusted to various tensions by adjustment of the bolts 5. A neat, simple and compact wheel is thus provided and the troubles due to the pneumatic feature are eliminated. The spring tire structure is held in spaced relation to the rim and yet is firmly and securely attached thereto by the bolts 5 which are not restrained at any point against inward radial movement. There is, however, only a very slight, if any, radial movement on the bolts 5 owing to the distributed stress pulling these bolts tightly against the inside of the felloe 1.

The wheel can be made at low cost and is quite inexpensive compared with the customary pneumatic tire structure.

It will, of course, be understood that various changes may be made in the form, details and arrangement of the parts without departing from the scope of applicants' invention, which, generally stated, consists in the matter shown and described and set forth in the appended claims.

What is claimed is:

1. A resilient wheel and tire structure comprising a felloe, a rim secured thereto, a helical spring surrounding said rim and spaced therefrom, and means for supporting said spring for movement toward and from said rim by members contacting only the inside of said spring.

2. The structure set forth in claim 1, said last mentioned means comprising circumferentially alined segmental members enclosed by said spring, and spaced bolts passing through the felloe and drawing said members toward the rim.

3. A resilient wheel and tire structure comprising a felloe, a rim secured thereto, a series of circumferentially alined segmental members forming an annulus about said rim and spaced outwardly therefrom, a resilient hoop spaced outwardly from said annulus and extending circumferentially about the wheel centrally thereof, a helical wire spring composed of circumferential sections extending about the rim and inclosing and contacting said annulus and hoop and separated from the rim and felloe so that there is a free space between said spring and said rim and felloe, and means for supporting said parts from the felloe.

4. The structure set forth in claim 3, the ends of said spring sections being secured to the ends of said segmental members.

5. The structure set forth in claim 4, the spring sections surrounding one of the segmental members being secured to the ends of the adjacent segmental members.

6. A resilient wheel and tire structure comprising a felloe, a rim secured thereto, a resilient hoop radially spaced from the rim, a helical spring surrounding and having a free space between its inner side and the rim and felloe and enclosing and contacting said hoop at its outer side, and means for supporting said spring in such a position from the said felloe.

7. The structure set forth in claim 6, and a tire casing in which said helical spring is embedded, and means for holding the inner edges of said casing against the inner sides of said rim.

8. A resilient wheel and tire structure comprising a felloe, a rim secured thereto, a helical spring surrounding said rim and having an open space between its inner side and said rim and felloe, means for transmitting the load stress about said spring, and means for supporting said spring solely from the inside thereof in said spaced relation to the rim and felloe and for adjusting the tension of said spring.

9. A resilient wheel and tire structure comprising a felloe, a rim secured thereto, a tire comprising an embedded helical spring, means for distributing the load pressure circumferentially about said spring, means for supporting said spring with an open space between its inner side and the rim and felloe, and separate means for holding the inner edges of said tire against the sides of the rim.

10. A resilient wheel and tire structure comprising a felloe, a rim secured thereto, circumferentially spaced bolts extending radially through the rim and felloe, circumferentially alined and overlapping segments spaced from said rim into which said bolts are threaded, a resilient hoop surrounding said segments and radially spaced therefrom, a helical spring surrounding said members and said hoop and inclosing and contacting the same, a tire casing in which said spring and hoop are embedded, alined segmental strips holding the edges of said tire against the sides of the rim, and a sleeve surrounding each of said bolts threaded into said segmental strips.

11. A resilient wheel and tire structure comprising a felloe, a rim secured thereto, circumferentially alined segments U-shaped in cross section extending about said rim and radially spaced therefrom, a helical spring embedded in a tire casing inclosing and attached to said segments, said segments resting in the inner side of said spring, and spaced bolts passing through the felloe and threaded into said segments and drawing the same toward the rim against said spring.

12. The structure set forth in claim 11, said segments being rabbeted at their ends to laterally overlap each other, and said helical spring being in sections having their ends attached to the ends of said segments.

13. A resilient wheel and tire structure comprising a felloe, a rim secured thereto, circumferentially alined segments U-shaped in cross section extending about the rim and spaced therefrom and having rabbeted laterally overlapping ends, a sectional helical spring surrounding said segments, the ends of the sections of said spring passing under the ends of said segments upwardly along the sides thereof and through said sides in which they are secured.

14. The structure set forth in claim 13, the ends of the spring sections surrounding one of said segments being secured in the ends of the adjacent segments.

15. A resilient wheel structure comprising a felloe, a rim secured thereto, a helical spring extending circumferentially about said rim and felloe, and means for supporting said spring by means contacting only the inner side thereof, with said inner side out of contact with said rim and felloe.

16. A resilient wheel structure comprising a felloe, an annular resilient hoop extending circumferentially about the same and radially spaced therefrom, a helical spring extending circumeferentially about said felloe and enclosing said hoop and disposed with a free space between its inner side and said felloe, and means for supporting said spring from the felloe for free movement toward said felloe at all circumferential points.

17. The structure set forth in claim 16, said last mentioned means comprising spaced members adapted to place said spring under tension.

18. A resilient wheel structure comprising a felloe, a helical spring extending circumferentially about the same and disposed with its inner side out of contact with any member and spaced from said felloe, and spaced means supporting said spring from the felloe and adapted to place the same under tension.

19. A resilient wheel structure comprising a felloe, an annular spring structure extending circumferentially about the same and disposed with its inner side uncontacted and spaced from said felloe, and means for distributing the load stress about said spring structure.

20. A resilient wheel structure comprising a rigid peripheral member, a resilient hop surrounding and spaced from said member substantially in the plane thereof, an annular helical spring surrounding and spaced from said member and enclosing and contacting said hoop, and means also enclosed by said spring and engaging the interior of its convolutions adjacent said member for tensioning and supporting said spring from said member.

21. A resilient wheel structure having a combination, a rigid peripheral member, a resilient hoop extending about and spaced from the same substantially in the plane thereof, an annular hollow resilient member also extending about and spaced from said peripheral member enclosing said hoop and contacting the same with its interior surface remote from said peripheral member, and means also enclosed by said hollow member and engaging its interior wall adjacent said peripheral member, said last named means suporting said hollow member from said peripheral member.

22. A resilient wheel and tire structure comprising a felloe a rim secured thereto, a helical spring supported from said felloe and spaced therefrom so that it can move freely toward said rim and felloe at all circumeferential points, and connecting means between said spring and felloe.

23. A resilient wheel and tire structure comprising a felloe, a rim secured thereto, a helical spring surrounding the rim and spaced therefrom with its side toward said rim uncontacted, and circumferentially spaced means for drawing said spring toward said felloe and rim to tension said spring.

24. A resilient wheel structure comprising a rigid peripheral member, a resilient means spaced from said member and extending circumferentially therearound out of contact therewith, and circumferentially spaced tension means connecting said resilient means to said peripheral member whereby said resilient means is unsupported by thrust from said peripheral member.

In testimony whereof we affix our signatures.

DE WITT NELSON.
CHARLES H. BURROWS.